United States Patent
Foschini et al.

(10) Patent No.: US 6,888,809 B1
(45) Date of Patent: May 3, 2005

(54) SPACE-TIME PROCESSING FOR MULTIPLE-INPUT, MULTIPLE-OUTPUT, WIRELESS SYSTEMS

(75) Inventors: Gerard Joseph Foschini, Sayerville, NJ (US); Angel Lozano, Holmdel, NJ (US); Farrokh Rashid-Farrokhi, Manalapan, NJ (US); Reinaldo A. Valenzuela, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/482,429

(22) Filed: Jan. 13, 2000

(51) Int. Cl.[7] ................................................ H04Q 7/00
(52) U.S. Cl. ........................ 370/334; 370/338; 370/347; 375/267; 375/347; 455/101
(58) Field of Search ........................ 370/310, 328–337, 370/345, 347, 442, 498, 536, 542; 375/267, 347, 260, 299, 346, 349, 350; 455/101, 67.3, 69, 63

(56) References Cited

U.S. PATENT DOCUMENTS

| | | | |
|---|---|---|---|
| 5,471,647 A | | 11/1995 | Gerlach et al. ................ 455/63 |
| 5,592,490 A | * | 1/1997 | Barratt et al. ................ 370/310 |
| 5,982,327 A | * | 11/1999 | Vook et al. ................... 342/380 |
| 6,317,466 B1 | * | 11/2001 | Foschini et al. ............ 375/267 |
| 6,351,499 B1 | * | 2/2002 | Paulraj et al. .............. 375/267 |

FOREIGN PATENT DOCUMENTS

| | | | |
|---|---|---|---|
| EP | 0 807 989 A1 | 11/1997 | ............ H01Q/3/26 |
| EP | 0 951 091 A2 | 10/1999 | ............ H01Q/3/26 |
| WO | 98 09381 A | 3/1998 | ............ H04B/1/38 |

OTHER PUBLICATIONS

Foschini et al, On Limits of Wireless Communications in a Fading Environment when Using Multiple Antennas, Kluwer Academic Publishers, pp. 311–335, 1998.*
Raleigh et al, Spatio–Temporal Coding for Wireless Communication, IEEE, pp. 357–366, 1998.*
Baltersee, Smart Antennas and Space–Time Processing, pp. 1–55, May 8, 1998.*

* cited by examiner

*Primary Examiner*—Frank Duong
(74) *Attorney, Agent, or Firm*—Eugene J. Rosenthal

(57) ABSTRACT

In a MIMO system the signals transmitted from the various antennas are processed so as to improve the ability of the receiver to extract them from the received signal even in the face of some correlation. More specifically the number of bit streams that is transmitted simultaneously is adjusted, e.g., reduced, depending on the level of correlation, while multiple versions of each bit stream, variously weighted, are transmitted simultaneously. The variously weighted versions are combined to produced one combined weighted signal. The receiver processes the received signals in the same manner as it would have had all the signals reaching the receive antennas been uncorrelated. The weight vectors may be determined by the forward channel transmitter using the channel properties of the forward link which are made known to the transmitter of the forward link by being transmitted from the receiver of the forward link by the transmitter of the reverse link or the weight vectors may be determined by the forward channel transmitter using the channel properties of the forward link and the determined weight vectors are made known to the transmitter of the forward link by being transmitted from the receiver of the forward link by the transmitter of the reverse link. The channel properties used to determine the weight vectors may include the channel response from the transmitter to the receiver and the covariance matrix of noise and interference measured at the receiver.

22 Claims, 2 Drawing Sheets

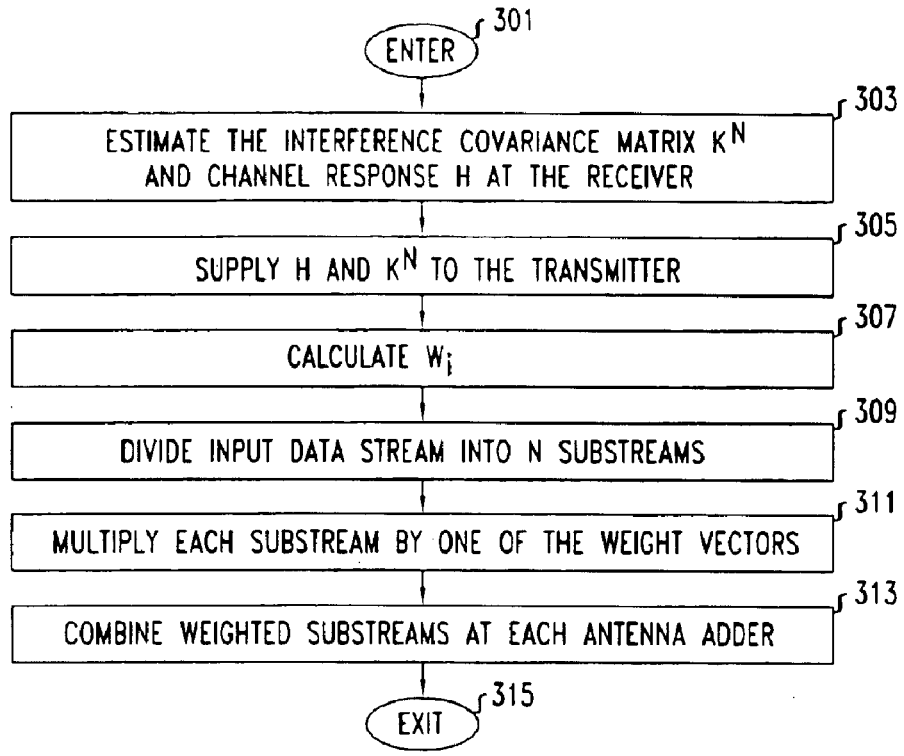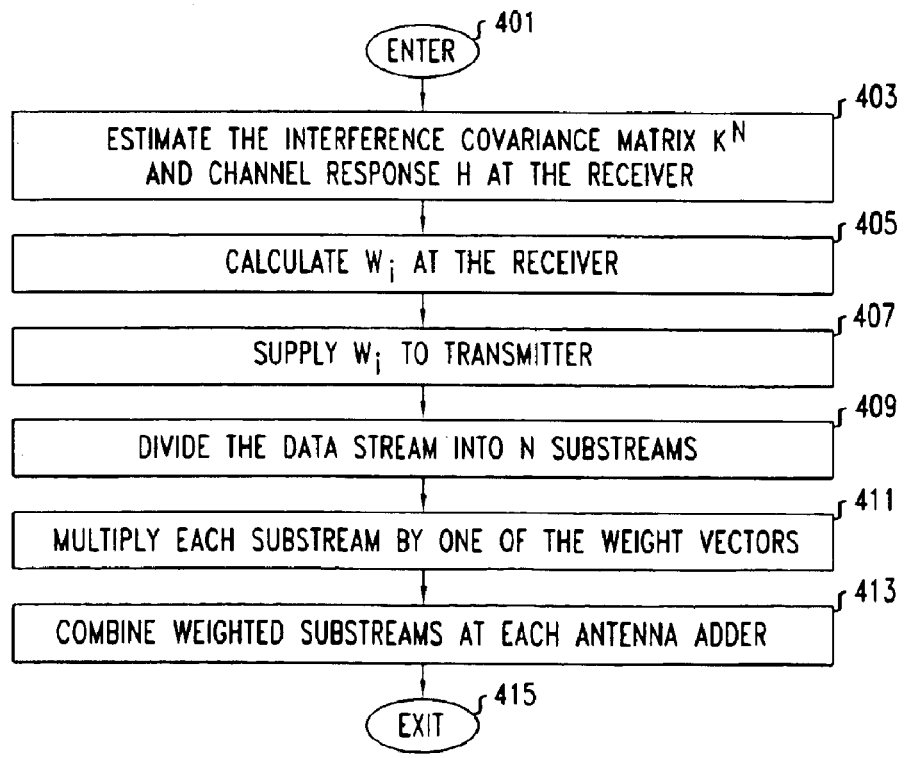

SPACE-TIME PROCESSING FOR MULTIPLE-INPUT, MULTIPLE-OUTPUT, WIRELESS SYSTEMS

TECHNICAL FIELD

This invention relates to the art of wireless communications, and more particularly, to wireless communication systems using multiple antennas at the transmitter and multiple antennas at the receivers, so called multiple-input, multiple-output (MIMO) systems.

BACKGROUND OF THE INVENTION

It is well known in the art that multiple-input, multiple-output (MIMO) systems can achieve dramatically improved capacity as compared to single antenna, i.e., single antenna to single antenna or multiple antenna to single antenna, systems. However, to achieve this improvement, it is preferable that there be a rich scattering environments, so that the various signals reaching the multiple receive antennas be largely uncorrelated. If the signals have some degree of correlation, and such correlation is ignored, performance degrades and capacity is reduced.

SUMMARY OF THE INVENTION

We have invented a way of developing signals in a MIMO system such that even in the face of some correlation so as to obtain the most performance and capacity that can be achieved with a channel of that level of correlation. In accordance with the principles of the invention, the signals transmitted from the various antennas are processed so as to improve the ability of the receiver to extract them from the received signal. More specifically the number of bit streams that is transmitted simultaneously is adjusted, e.g., reduced, depending on the level of correlation, while multiple versions of each bit stream, variously weighted, are transmitted simultaneously. The variously weighted versions are combined to produced one combined weighted signal, a so-called "transmit vector", for each antenna. The receiver processes the received signals in the same manner as it would have had all the signals reaching the receive antennas been uncorrelated.

In one embodiment of the invention, the weight vectors are determined by the forward channel transmitter using the channel properties of the forward link which are made known to the transmitter of the forward link by being transmitted from the receiver of the forward link by the transmitter of the reverse link. In another embodiment of the invention the weight vectors are determined by the forward channel receiver using the channel properties of the forward link and the determined weight vectors are made known to the transmitter of the forward link by being transmitted from the receiver of the forward link by the transmitter of the reverse link.

The channel properties used to determine the weight vectors may include the channel response from the transmitter to the receiver and the covariance matrix of noise and interference measured at the receiver.

BRIEF DESCRIPTION OF THE DRAWING

In the drawing:

FIG. 3 shows an exemplary process, in flow chart form, for developing signals to transmit in a MIMO system such that even in the face of some correlation the most performance and capacity that can be achieved with a channel of that level of correlation is obtained, in accordance with the principles of the invention;

FIG. 4 shows another exemplary process, in flow chart form, for developing signals to transmit in a MIMO system such that even in the face of some correlation the most performance and capacity that can be achieved with a channel of that level of correlation is obtained, in accordance with the principles of the invention.

DETAILED DESCRIPTION

Figure 1:
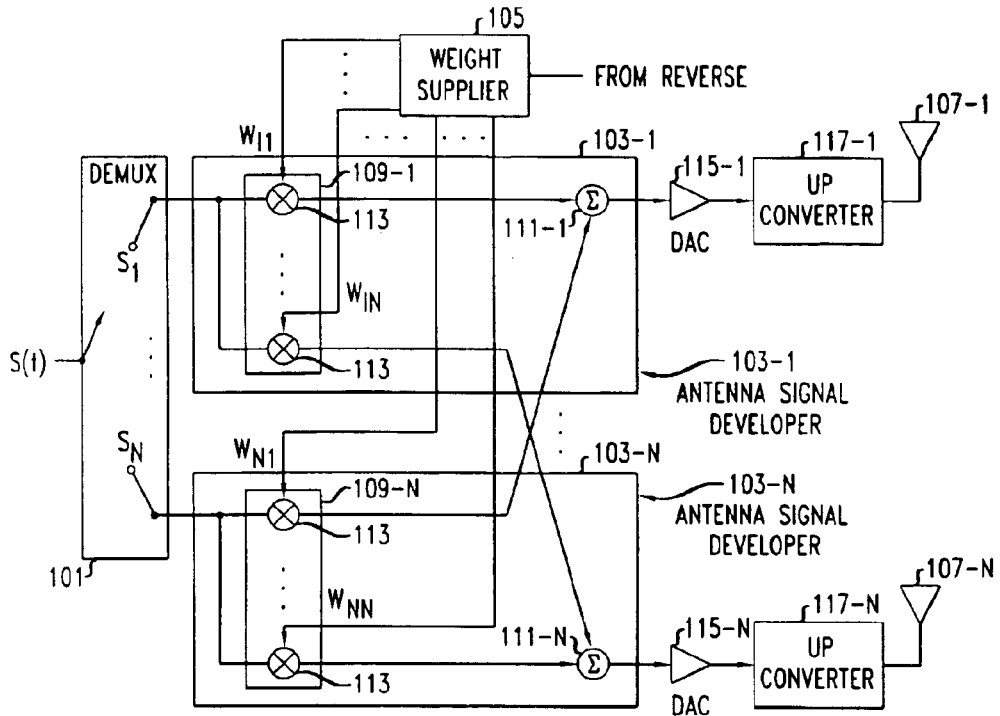
FIG. 1 shows an exemplary portion of a transmitter for developing signals to transmit in a MIMO system such that even in the face of some correlation the most performance and capacity that can be achieved with a channel of that level of correlation is obtained, in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

FIG. 1 shows an exemplary portion of a transmitter for developing signals to transmit in a MIMO system having a transmitter with N transmit antennas transmitting over a forward channel to a receiver having L receiver antennas and a reverse channel for communicating from said receiver to said transmitter, such that even in the face of some correlation the most performance and capacity that can be achieved with a channel of that level of correlation is obtained, in accordance with the principles of the invention. Shown in FIG. 1 are a) demultiplexer (demux) 101; b) antenna signal developers 103, including antenna signal developers 103-1 through 103-N; c) weight supplier 105; d) N antennas 107, including antennas 107-1 through 107-N; e) digital-to-analog converters (DAC) 115, including 115-1 through 115-N; and f) upconverters 117, including upconverters 117-1 through 117-N.

Demultiplexer 101 takes a data stream as an input and supplies as an output data substreams by supplying various bits from the input data stream to each of the data substreams. One data substream may be supplied by demultiplexer 101 to one of N outputs. However, when the number of uncorrelated signals that can be transmitted is reduced, the number of bit streams that are transmitted simultaneously is reduced to match the number of uncorrelated signals that can be transmitted. In such a case, the particular outputs utilized is at the discretion of the implementor. For example, only the first Y outputs, where Y is the number of uncorrelated signals that can be transmitted, are employed.

Each data substream is supplied to a corresponding one of antenna signal developers 103. Each one of antenna signal developers 103 includes one of weight blocks 109-1 through 109-N and one of adders 111-1 through 111-N. Within each of antenna signal developers 103 the data substream is supplied to each of multipliers 113 within the one of weight blocks 109 therein.

Weight supplier 105 supplies weight values to each of multipliers 113. In one embodiment of the invention weight supplier 105 actually develops the weight values in response to information received via the reverse channel from the receiver (not shown). In another embodiment of the invention the weight values are developed in the receiver, then supplied via the reverse channel to the transmitter, in which they are stored in weight supplier 105 until such time as they are required. A process for developing the weights in accordance with an aspect of the invention will be described hereinbelow.

Each of multipliers 113 multiplies the substream it receives by the weight it receives. The resulting product is supplied to a respective one of adders 111. More specifically, the product supplied by the Rth multiplier of each weight block 109, where R is from 1 to N, is supplied to the Rth one of adders 111. For those multipliers that are not supplied with a substream, their output is insured to be zero (0), by any technique desired by the implementor.

Each of adders 111 adds the signals input to it and supplies the resulting sum as an output to its associated respective one of DACs 115. Each of DACs 115 takes the digital signal it receives from one of adders 111 and converts it to an analog baseband signal. The analog baseband signal produced by each of DACs 115 is supplied to a respective one of upconverters 117, which upconverts the baseband analog signal to a radio frequency signal. The radio frequency signals produced by upconverters 117 are supplied to respective ones of antennas 107 for broadcast to a receiver.

Figure 2:
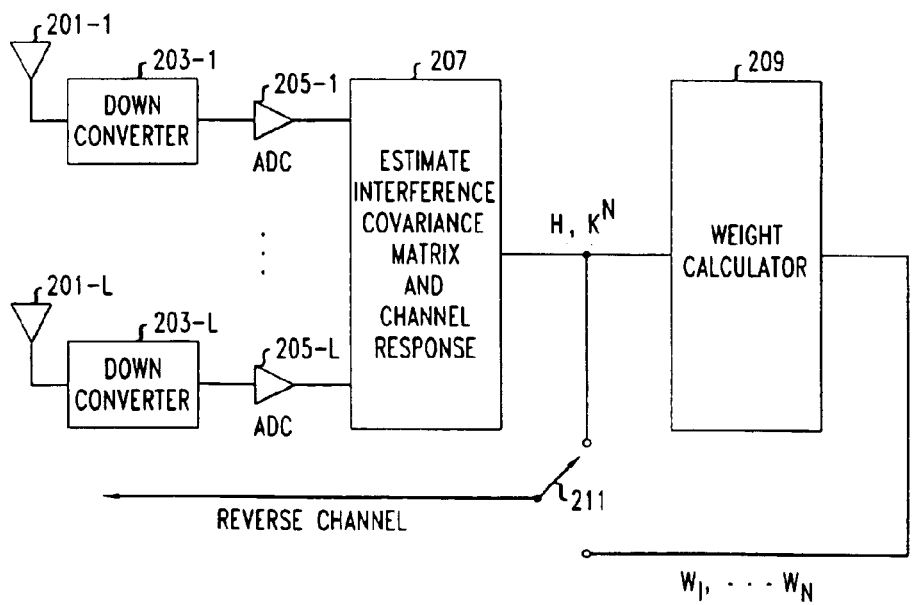
FIG. 2 shows an exemplary portion of a receiver for a MIMO system arranged in accordance with the principles of the invention.

FIG. 2 shows an exemplary portion of a receiver for a MIMO system arranged in accordance with the principles of the invention. FIG. 2 shows a) L antennas 201, including antennas 201-1 through 201-L; b) downconverters 203, including downconverters 203-1 through 203-L; c) analog-to-digital converters (ADCs) 205, including analog-to-digital converters 205-1 through 205-L; d) estimate interference covariance matrix and channel response unit 207; e) optional weight calculator 209; and f) optional switch 211.

Each of antennas 201 receives radio signals and supplies an electrical version thereof to its respective, associated one of downconverters 203. Each of downconverters 203 downconverts the signal it receives to baseband, and supplies the resulting baseband signal to its associated one of ADCs 205. Each of ADCs 205 converts the baseband analog signal it received to a digital representation and supplies the digital representation to estimate interference covariance matrix and channel response unit 207.

Estimate interference covariance matrix and channel response unit 207 develops an estimate of the interference covariance matrix and an estimate of the forward matrix channel response in the conventional manner. Note that matrices are required because there are multiple transmit antennas and multiple receive antennas.

The estimate of the interference covariance matrix and an estimate of the forward matrix channel response are supplied either to optional weight calculator 209 or they are supplied for via the reverse channel to the transmitter (FIG. 1). If the estimate of the interference covariance matrix and an estimate of the forward matrix channel response is supplied to weight calculator 209, weight calculator determines the weight values that are to be used, in accordance with an aspect of the invention and as described hereinbelow, and supplies the resulting weight values to the transmitter (FIG. 1) via the reverse channel.

FIG. 3 shows an exemplary process, in flow chart form, for developing signals to transmit in a MIMO system having a transmitter with N transmit antennas transmitting over a forward channel to a receiver having L receiver antennas and a reverse channel for communicating from said receiver to said transmitter, such that even in the face of some correlation the most performance and capacity that can be achieved with a channel of that level of correlation is obtained, in accordance with the principles of the invention. The process of FIG. 3 may be employed in an embodiment of the invention that uses the hardware of FIGS. 1 and 2, with switch 211 being connected to estimate interference covariance matrix and channel response unit 207 and with a communication protocol as follows. First it is necessary to determine the length of time during which the channel characteristics are stable. This is typically performed at the system engineering phase of developing the system, using measurements of the environment into which the system is to be deployed, as is well known by those of ordinary skill in the art. Once the length of time for which the channel characteristics are stable is known, that time is considered as a frame, and the frame is divided into time slots. Each frame has a preamble, which may occupy one or more of the time slots. The frames, and accordingly the time slots, are repeating in nature.

The process of FIG. 3 is entered in step 301 at the beginning of each frame. Next, in step 303, the interference covariance matrix $K^N$ and channel response 11 at the receiver are determined, e.g., in the receiver of the forward link, such as in interference covariance matrix and channel response unit 207 (FIG. 2). Thereafter, in step 305, (FIG. 3) interference covariance matrix $K^N$ and channel response matrix H are supplied by the receiver of the forward link to the transmitter of forward link, e.g., via the reverse channel.

In step 307 weights $w_i = [w_{i1}, \ldots, w_{iN}]$ are calculated, e.g., by weight supplier 105 (FIG. 1), where i is an integer ranging from 1 to N. More specifically, the weights are calculated as follows. First the matrix equation $H^\dagger(K^N)H = U^\dagger \Lambda^2 U$ is solved, where:

a) H is the channel response matrix;
b) $H^\dagger$ is the conjugate transpose of channel response matrix H, † being the well known symbol for conjugate transpose;
c) $K^N$ is the interference covariance matrix;
d) U is a unitary matrix, each column of which is an eigenvector of $H^\dagger(K^N)H$;
e) $\Lambda$ is a diagonal matrix defined as $\Lambda = \text{diag}(\lambda^1, \ldots, \lambda^M)$, where $\lambda^1, \ldots, \lambda^M$ are each eignevalues of $H^\dagger(K^N)H$, M being the maximum number of nonzero eigenvalues, which corresponds to the number of substreams that actually can be used; and
f) $U^\dagger$ is the conjugate transpose of matrix U.

Then well known, so-called "waterfilling" is performed on the eigenvalues $\lambda$ by solving the simultaneous equations $$\tilde{\lambda}^k = \left(v - \frac{1}{(\lambda^k)^2}\right)^+ \text{ and } \sum_k \tilde{\lambda}^k = P,$$

for v, where:
k is an integer index that ranges from 1 to M;
P is the transmitted power;
+ is an operator that returns zero (0) when its argument is negative, and returns the argument itself when it is positive; and
each $\lambda$ is an intermediate variable representative of a power for each weight vector.

A new matrix $\Phi$ is defined as $\Phi = U^\dagger \text{diag}(\lambda^1, \ldots, \lambda^M)U$, where diag indicates that the various $\lambda$ are arranged as the elements of the main diagonal of the matrix, all other entries being zero (0). Each column of matrix $\Phi$ is used as a normalized, i.e., based on unit power, weight vector as indicated by $\Phi = [z_1, \ldots, z_N]$ and the weight vectors are made up of individual weights z, $z_i = [z_{i1}, \ldots, z_{iN}]$. The weight vector $w_i = [w_{i1}, \ldots, w_{iN}]$ is then determined by unnormalizing, based on the power to be assigned to the weight vector, the various weights therein, being $\sqrt{\tilde{\lambda}^i} z_{ij}$, where j is an integer ranging from 1 to N.

In step 309 the input data stream, S(t) (FIG. 1), is divided into N substreams $S_1 \ldots S_N$, e.g., by demultiplexer 101.

Each of the data streams is then multiplied by a respective one of weight vectors $w_{i1}, \ldots, w_{iN}$, in step 311 (FIG. 3). In other words, each bit of each of each particular data stream is multiplied by each of the weights in its respective weight vector to produce N weighted bits for each data stream.

In step 313 the weighted bits for each of the substreams is combined by each antenna adder, e.g., adders 111. In this regard, the weighted bit produced for each substream from the first weight is added at the adder of the first antenna, the weighted bit produced for each substream from the second weight is added at the adder of the second antenna, and so forth, as indicated in FIG. 1. As will be readily apparent from the foregoing, any substream greater in number than M will be zero, since M corresponds to the number of substreams that actually can be used. Such zero substreams do not contribute to the sum produced by adders 111.

The process then exits in step 315.

FIG. 4 shows another exemplary process, in flow chart form, for developing signals to transmit in a MIMO system having a transmitter with N transmit antennas transmitting over a forward channel to a receiver having L receiver antennas and a reverse channel for communicating from said receiver to said transmitter, such that even in the face of some correlation the most performance and capacity that can be achieved with a channel of that level of correlation is obtained, in accordance with the principles of the invention. The process of FIG. 4 may be employed in an embodiment of the invention that uses the hardware of FIGS. 1 and 2, with switch 211 being connected to weight calculator 209 and with a communication protocol as described in connection with FIG. 3. Note that for the process of FIG. 4, weight supplier 105 of FIG. 1 will not compute the various weights, but will instead merely store the weights received from weight calculator 209 and supply them to the various ones of multipliers 113 as is necessary.

The process of FIG. 4 is entered in step 401 at the beginning of each frame. Next, in step 403, the interference covariance matrix $K^N$ and channel response H at the receiver are determined, e.g., in the receiver of the forward link, such as in interference covariance matrix and channel response unit 207 (FIG. 2). In step 405 weights $w_i = [w_{i1}, \ldots, w_{iN}]$ are calculated, e.g., by weight supplier 105 (FIG. 1). More specifically, the weights are calculated as follows.

First the matrix equation $H^\dagger(K^N)H = U^\dagger \Lambda^2 U$ is solved, where:

a) H is the channel response matrix;
b) $H^\dagger$ is the conjugate transpose of channel response matrix H, † being the well known symbol for conjugate transpose;
c) $K^N$ is the interference covariance matrix;
d) U is a unitary matrix, each column of which is an eigenvector of $H^\dagger(K^N)H$;
e) $\Lambda$ is a diagonal matrix defined as $\Lambda = \text{diag}(\lambda^1, \ldots, \lambda^M)$, where $\lambda^1, \ldots, \lambda^M$ are each eignevalues of $H^\dagger(K^N)H$, M being the maximum number of nonzero eigenvalues, which corresponds to the number of substreams that actually can be used; and
f) $U^\dagger$ is the conjugate transpose of matrix U.

Then well known, so-called "waterfilling" is performed on the eigenvalues $\lambda$ by solving the simultaneous equations $$\tilde{\lambda}^k = \left(v - \frac{1}{(\lambda^k)^2}\right)^+ \text{ and } \sum_k \tilde{\lambda}^k = P.$$

for v, where:

k is an integer index that ranges from 1 to M;

P is the transmitted power;

+ is an operator that returns zero (0) when its argument is negative, and returns the argument itself when it is positive; and each λ is an intermediate variable representative of a power for each weight vector.

A new matrix $\Phi$ is defined as $\Phi=U^{\dagger}\text{diag}(\lambda^1, \ldots, \lambda^M)U$, where diag indicates that the various λ are arranged as the elements of the main diagonal of the matrix, all other entries being zero (0). Each column of matrix $\Phi$ is used as a normalized, i.e., based on unit power, weight vector as indicated by $\Phi=[z_1, \ldots z_N]$ and the weight vectors are made up of individual weights z, $z_i=[z_{i1}, \ldots, z_{iN}]$. The weight vector $w_i=[w_{i1}, \ldots, w_{iN}]$ is then determined by unnormalizing, based on the power to be assigned to the weight vector, the various weights therein being $\sqrt{\tilde{\lambda}^i}z_{ij}$, where j is an integer ranging from 1 to N.

Thereafter, in step 407, the determined weight values are supplied by the receiver of the forward link to the transmitter of forward link, e.g., via the reverse channel. The weights are stored in weight supplier 105 (FIG. 1).

In step 409 (FIG. 4) the input data stream. S(t) (FIG. 1), is divided into N substreams $S_1 \ldots S_N$, e.g., by demultiplexer 101. Each of the data streams is then multiplied by a respective one of weight vectors $w_{i1}, \ldots, w_{iN}$, in step 411 (FIG. 4), where i is an integer ranging from 1 to N. In other words, each bit of each of each particular data stream is multiplied by each of the weights in its respective weight vector to produce N weighted bits for each data stream.

In step 413 the weighted bits for each of the substreams is combined by each antenna adder, e.g., adders 111. In this regard, the weighted bit produced for each substream from the first weight is added at the adder of the first antenna, the weighted bit produced for each substream from the second weight is added at the adder of the second antenna, and so forth, as indicated in FIG. 1. As will be readily apparent from the foregoing, any substream greater in number than M will be zero, since M corresponds to the number of substreams that actually can be used. Such zero substreams do not contribute to the sum produced by adders 111.

The process then exits in step 415.

In another embodiment of the invention, for use with so-called "time division duplex" (TDD) systems, which share a single channel for both the forward and reverse channels, the estimation of the channel response may be performed at either end of the wireless link. This is because since the forward and reverse channels share the same frequency channel, alternating between which is using the channel at any one time, then provided the time split between the forward and reverse channel is small, the channel response for the forward and reverse channels will be the same. Therefore, the receiver of the reverse channel will experience the same channel response as the receiver of the forward channel, and so the receiver of the reverse link can perform all the channel estimations that were previously performed by the receiver of the forward link. Likewise, the receiver of the forward channel will experience the same channel response as the receiver of the reverse channel, and so the receiver of the forward link can perform all the channel estimations that were previously performed by the receiver of the reverse link.

What is claimed is:

1. A method for transmitting signals in communications system having a transmitter with N transmit antennas transmitting over a forward channel to a receiver having L receiver antennas and a reverse channel for communicating from said receiver to said transmitter, in which there may exist correlation in the signals received by two or more of said L receive antennas, the method comprising the steps of:

determining the number of independent signals that can be transmitted from said N transmit antennas to said L receive antennas;

creating, from a data stream, a data substream to be transmitted for each of the number of independent signals that can be transmitted from said N transmit antennas to said L receive antennas;

weighting each of said substreams with N weights, one weight for each of said N transmit antennas, to produce N weighted substreams per substream;

combining one of said weighted substreams produced from each of said substreams for each of said transmit antennas to produce a transmit signal for each of said transmit antennas.

2. The invention as defined in claim 1 further comprising the step of transmitting said transmit signal from a respective one of said antennas.

3. The invention as defined in claim 1 further comprising the step of receiving said weights via said reverse channel.

4. The invention as defined in claim 1 wherein said weights are determined by said transmitter as a function of channel information and interference covariance received from said receiver via said reverse channel.

5. The invention as defined in claim 1 wherein said weights are determined by solving a matrix equation $H^{\dagger}(K^N)H=U^{\dagger}\Lambda^2U$ where:

H is a channel response matrix, $H^{\dagger}$ is a conjugate transpose of said channel response matrix H, $K^N$ is the interference covariance matrix, U is a unitary matrix, each column of which is an eigenvector of $H^{\dagger}(K^N)H$, $\Lambda$ is a diagonal matrix defined as $\Lambda=\text{diag}(\lambda^1, \ldots, \lambda^M)$, where $\lambda^1, \ldots, \lambda^M$ are each eignevalues of $H^{\dagger}(K^N)H$, M being the maximum number of nonzero eigenvalues, which corresponds to the number of said independent signals, and $U^{\dagger}$ is the conjugate transpose of matrix U;

waterfilling said eigenvalues λ by solving the simultaneous equations $$\tilde{\lambda}^k = \left(v - \frac{1}{(\lambda^k)^2}\right)^+ \text{ and } \sum_k \tilde{\lambda}^k = P,$$

for v, where:

k is an integer index that ranges from 1 to M,

P is the transmitted power,

+ is an operator that returns zero (0) when its argument is negative, and returns the argument itself when it is positive, and each λ is an intermediate variable representative of a power for each weight vector, defining matrix $\Phi$ as $\Phi=U^{\dagger}\text{diag}(\lambda^1, \ldots, \lambda^M)U$, where diag indicates the various λ are arranged as the elements of the main diagonal of matrix $\Phi$, wherein each column of matrix $\Phi$ is used as a normalized weight vector indicated by $\Phi=[z_1, \ldots, z_N]$ and said normalized weight vectors are made up of individual normalized weights z, $z_i=[z_{i1}, \ldots, z_{iN}]$, where i is an integer ranging from 1 to N, developing an unnormalized weight vector $w_i=[w_{i1}, \ldots, w_{iN}]$, with each of said weights therein being $\sqrt{\tilde{\lambda}^i} z_{ij}$, where j is an integer ranging from 1 to N.

6. Apparatus for transmitting signals in communications system having a transmitter with N transmit antennas transmitting over a forward channel to a receiver having L receiver antennas and a reverse channel for communicating from said receiver to said transmitter, in which there may exist correlation in the signals received by two or more of said L receive antennas, the apparatus comprising:

means for determining the number of independent signals that can be transmitted from said N transmit antennas to said L receive antennas;

means for creating, from a data stream, a data substream to be transmitted for each of the number of independent signals that can be transmitted from said N transmit antennas to said L receive antennas;

means for weighting each of said substreams with N weights, one weight for each of said N transmit antennas, to produce N weighted substreams per substream;

means for combining one of said weighted substreams produced from each of said substreams for each of said antennas to produce a transmit signal for each antenna.

7. The invention as defined in claim 6 wherein said transmitter comprises means for developing said weights.

8. The invention as defined in claim 6 wherein said transmitter comprises means for storing said weights.

9. The invention as defined in claim 6 wherein said receiver comprises means for developing said weights.

10. A transmitter for transmitting signals in communications system having a transmitter with N transmit antennas transmitting over a forward channel to a receiver having L receiver antennas and a reverse channel for communicating from said receiver to said transmitter, in which there may exist correlation in the signals received by two or more of said L receive antennas, the apparatus comprising:

a demultiplexor for creating, from a data stream, a data substream to be transmitted for each of the number of independent signals that can be transmitted from said N transmit antennas to said L receive antennas;

multipliers for weighting each of said substreams with N weights, one weight for each of said N transmit antennas, to produce N weighted substreams per substream, each of said weights being a function of at least an estimate interference covariance matrix and an estimate of a forward matrix channel response between said transmitter and said receiver; and adders for combining one of said weighted substreams produced from each of said substreams for each of said antennas to produce a transmit signal for each of said transmit antennas.

11. The invention as defined in claim 10 further comprising a digital to analog converter for converting each of said combined weighted substreams.

12. The invention as defined in claim 10 further comprising an upconverter for converting to radio frequencies each of said analog-converted combined weighted substreams.

13. The invention as defined in claim 10 wherein said weights are determined in said transmitter in response to said interference covariance matrix estimate and said estimate of the forward channel response received from said receiver over said reverse channel.

14. The invention as defined in claim 10 wherein said weights are determined in said receiver and are transmitted to said transmitter over said reverse channel.

15. The invention as defined in claim 10 wherein said weights are determined by solving a matrix equation $H^\dagger(K^N)H = U^\dagger \Lambda^2 U$ where:

H is a channel response matrix, $H^\dagger$ is a conjugate transpose of said channel response matrix H, $K^N$ is the interference covariance matrix, U is a unitary matrix, each column of which is an eigenvector of $H^\dagger(K^N)H$, $\Lambda$ is a diagonal matrix defined as $\Lambda = \text{diag}(\lambda^1, \ldots, \lambda^M)$, where $\lambda^1, \ldots, \lambda^M$ are each eignevalues of $H^\dagger(K^N)H$, M being the maximum number of nonzero eigenvalues, which corresponds to the number of said independent signals, and $U^\dagger$ is the conjugate transpose of matrix U, waterfilling said eigenvalues $\lambda$ by solving the simultaneous equations $$\tilde{\lambda}^k = \left(v - \frac{1}{(\lambda^k)^2}\right)^+ \text{ and } \sum_k \tilde{\lambda}^k = P,$$

for v, where:

k is an integer index that ranges from 1 to M,

P is the transmitted power,

+ is an operator that returns zero (0) when its argument is negative, and returns the argument itself when it is positive, and each $\lambda$ is an intermediate variable representative of a power for each weight vector, defining matrix $\Phi$ as $\Phi = U^\dagger \text{diag}(\lambda^1, \ldots, \lambda^M)U$, where diag indicates that the various $\lambda$ are arranged as the elements of the main diagonal of matrix $\Phi$;

wherein each column of matrix $\Phi$ is used as a normalized weight vector indicated by $\Phi = [z_1, \ldots, z_N]$ and said normalized weight vectors are made up of individual normalized weights z, $z_i = [z_{i1}, \ldots, z_{iN}]$, where i is an integer ranging from 1 to N, developing unnormalized weight vector $w_i = [w_{i1}, \ldots, w_{iN}]$, with each of said weights therein being $\sqrt{\tilde{\lambda}^i} z_{ij}$, where j is an integer ranging from 1 to N.

16. The invention as defined in claim 10 wherein said transmitter and receiver communicate using time division multiplexing (TDD) and said weights are determined in said transmitter using an estimate of the forward channel response that is determined by a receiver of said reverse link for said transmitter.

17. A receiver for use in a MIMO system, comprising:

L antennas;

L downconverters;

an estimator for determining an estimate of an interference covariance matrix for a forward channel being received by said receiver; and a transmitter for a reverse channel for transmitting said estimate of an interference covariance matrix to a receiver for said reverse channel.

18. A receiver for use in a MIMO system, comprising:

L antennas;

L downconverters;

an estimator for determining an estimate of an interference covariance matrix for a forward channel being received by said receiver;

an estimator for determining an estimate of a channel response for a forward channel being received by said receiver; and a transmitter for a reverse channel for transmitting said estimate of an interference covariance matrix and said estimate of a channel response to a receiver for said reverse channel.

19. A receiver for use in a MIMO system, comprising:
an estimator for determining an estimate of an interference covariance matrix for a forward channel being received by said receiver;
an estimator for determining an estimate of a channel response for a forward channel being received by said receiver; and
a weight calculator for calculating weights for use by a transmitter of said forward channel to transmit data substreams to said receiver as a function of said estimate of an interference covariance matrix for a forward channel being received by said receiver and said estimate of a channel response for a forward channel being received by said receiver.

20. The invention as defined in claim 19 further including a transmitter for a reverse channel for transmitting said weights to a receiver for said reverse channel.

21. A receiver for use in a MIMO system, comprising:
L antennas;
L downconverters;
an estimator for determining an estimate of an interference covariance matrix for a forward channel being received by said receiver;
an estimator for determining an estimate of a channel response for a forward channel being received by said receiver; and
a weight calculator for calculating weights for use by a transmitter of said forward channel to transmit data substreams to said receiver, said weights being determined in said weight calculator by
solving a matrix equation $H^\dagger(K^N)H=U^\dagger\Lambda^2 U$ where:
H is a channel response matrix;
$H^\dagger$ is a conjugate transpose of said channel response matrix H;
$K^N$ is the interference covariance matrix;
U is a unitary matrix, each column of which is an eigenvector of $H^{\dagger(KN)}H$;
$\Lambda$ is a diagonal matrix defined as $\Lambda=\mathrm{diag}(\lambda^1, \ldots, \lambda^M)$, where $\lambda^1, \ldots, \lambda^M$ are each eignevalues of $H^\dagger(K^N)H$, M being the maximum number of nonzero eigenvalues, which corresponds to the number of said independent signals; and
$U^\dagger$ is the conjugate transpose of matrix U;
waterfilling said eigenvalues $\lambda$ by solving the simultaneous equations $$\tilde{\lambda}^k = \left(v - \frac{1}{(\lambda^k)^2}\right)^+ \text{ and } \sum_k \tilde{\lambda}^k = P,$$

for v, where:
k is an integer index that ranges from 1 to M;
P is the transmitted power;
+ is an operator that returns zero (0) when its argument is negative, and returns the argument itself when it is positive; and
each $\lambda$ is an intermediate variable representative of a power for each weight vector;
defining matrix $\Phi$ as $\Phi=U^\dagger\mathrm{diag}(\lambda^1, \ldots, \lambda^M)U$, where diag indicates that the various $\lambda$ are arranged as the elements of the main diagonal of matrix $\Phi$;

wherein each column of matrix $\Phi$ is used as a normalized weight vector indicated by $\Phi=[z_1, \ldots, z_N]$ and said normalized weight vectors are made up of individual normalized weights z, $z_i=[z_{i1}, \ldots, z_{iN}]$, where i is an integer ranging from 1 to N;
developing unnormalized weight vector $w_i=[w_{i1}, \ldots, w_{iN}]$, with each of said weights therein being $\sqrt{\tilde{\lambda}^i}z_{ij}$, where j is an integer ranging from 1 to N.

22. A method for determining weights for use in transmitting signals in communications system having a transmitter with N transmit antennas transmitting over a forward channel to a receiver having L receiver antennas and a reverse channel for communicating from said receiver to said transmitter, in which there may exist correlation in the signals received by two or more of said L receive antennas, the method comprising the steps of:
determining the number of independent signals M that can be transmitted from said N transmit antennas to said L receive antennas through a process of determining weights for substreams derived from data to be transmitted via said N antennas as part of forming said signals, wherein said weights are determined by
solving a matrix equation $H^\dagger(K^N)H=U^\dagger\Lambda^2 U$ where:
H is a channel response matrix,
$H^\dagger$ is a conjugate transpose of said channel response matrix H,
$K^N$ is the interference covariance matrix,
U is a unitary matrix, each column of which is an eigenvector of $H^\dagger(K^N)H$,
$\Lambda$ is a diagonal matrix defined as $\Lambda=\mathrm{diag}(\lambda^1, \ldots, \lambda^M)$, where $\lambda^1, \ldots, \lambda^M$ are each eigenvalues of $H^\dagger(K^N)H$, M being the maximum number of nonzero eigenvalues, which corresponds to the number of said independent signals, and
$U^\dagger$ is the conjugate transpose of matrix U,
waterfilling said eigenvalues $\lambda$ by solving the simultaneous equations $$\tilde{\lambda}^k = \left(v - \frac{1}{(\lambda^k)^2}\right)^+ \text{ and } \sum_k \tilde{\lambda}^k = P,$$

for v, where:
k is an integer index that ranges from 1 to M,
P is the transmitted power,
+is an operator that returns zero (0) when its argument is negative, and returns the argument itself when it is positive, and
each $\lambda$ is an intermediate variable representative of a power for each weight vector,
defining matrix $\Phi$ as $\Phi=U^\dagger\mathrm{diag}(\lambda^1, \ldots, \lambda^M)U$, where diag indicates that the various $\lambda$ are arranged as the elements of the main diagonal of matrix $\Phi$,
wherein each column of matrix $\Phi$ is used as a normalized weight vector indicated by $\Phi=[z_1, \ldots, z_N]$ and said normalized weight vectors are made up of individual normalized weights z, $z_i=[z_{i1}, \ldots, z_{iN}]$, where i is an integer ranging from 1 to N,
developing unnormalized weight vector $w_i=[w_{i1}, \ldots, w_{iN}]$, with each of said weights therein being $\sqrt{\tilde{\lambda}^i}z_{ij}$, where j is an integer ranging from 1 to N.

* * * * *

UNITED STATES PATENT AND TRADEMARK OFFICE
CERTIFICATE OF CORRECTION

Page 1 of 2

PATENT NO.        : 6,888,809 B1
APPLICATION NO.   : 09/482429
DATED             : May 3, 2005
INVENTOR(S)       : Gerard Joseph Foschini et al.

It is certified that error appears in the above-identified patent and that said Letters Patent is hereby corrected as shown below:

In the Claims

Column 7, lines 65-67 and Column 8, lines 1-18, Claim 1 should read:
1. A method for transmitting signals in communications system having a transmitter with N transmit antennas transmitting over a forward channel to a receiver having L receiver antennas and a reverse channel for communicating from said receiver to said transmitter, in which there may exist correlation in the signals received by two or more of said L receive antennas, the method comprising the steps of:
    determining the number of independent signals that can be transmitted from said N transmit antennas to said L receive antennas;
    creating, from a data stream, a data substream to be transmitted for each of the number of independent signals that can be transmitted from said N transmit antennas to said L receive antennas;
    weighting each of said substreams with N weights, one weight for each of said N transmit antennas, said weights being determined by said transmitter as a function of channel information and an interference covariance matrix, to produce N weighted substreams per substream;
    combining one of said weighted substreams produced from each of said substreams for each of said transmit antennas to produce a transmit signal for each of said transmit antennas.

Column 8, lines 25-28, Claim 4 should read:
4. The invention as defined in claim 1 wherein said channel information and said interference covariance matrix are received by said transmitter from said receiver via said reverse channel.

Column 9, lines 4-24, Claim 6 should read:
6. Apparatus for transmitting signals in communications system having a transmitter with N transmit antennas transmitting over a forward channel to a receiver having L receiver antennas and a reverse channel for communicating from said receiver to said transmitter, in which there may exist correlation in the signals received by two or more of said L receive antennas, the apparatus comprising:
    means for determining the number of independent signals that can be transmitted from said N transmit antennas to said L receive antennas;

Signed and Sealed this
Second Day of December, 2014

Michelle K. Lee
*Deputy Director of the United States Patent and Trademark Office* means for creating, from a data stream, a data substream to be transmitted for each of the number of independent signals that can be transmitted from said N transmit antennas to said L receive antennas;

means for weighting each of said substreams with N weights, one weight for each of said N transmit antennas, said weights being determined by said apparatus for transmitting signals as a function of information about said forward channel and an interference covariance matrix, to produce N weighted substreams per substream;

means for combining one of said weighted substreams produced from each of said substreams for each of said antennas to produce a transmit signal for each antenna.

Column 9, lines 31-53, Claim 10 should read:
10. A transmitter for transmitting signals in communications system having a transmitter with N transmit antennas transmitting over a forward channel to a receiver having L receiver antennas and a reverse channel for communicating from said receiver to said transmitter, in which there may exist correlation in the signals received by two or more of said L receive antennas, the transmitter comprising:

a demultiplexor for creating, from a data stream, a data substream to be transmitted for each of the number of independent signals that can be transmitted from said N transmit antennas to said L receive antennas multipliers for weighting each of said substreams with N weights, one weight for each of said N transmit antennas, wherein said weights are determined in said transmitter in response to an interference covariance matrix estimate and an estimate of the forward channel response, to produce N weighted substreams per substream, each of said weights being a function of at least an estimate interference covariance matrix and an estimate of a forward matrix channel response between said transmitter and said receiver; and adders for combining one of said weighted substreams produced from each of said substreams for each of said antennas to produce a transmit signal for each of said transmit antennas.

Column 9, lines 60-64, Claim 13 should read:
13. The invention as defined in claim 10 wherein said interference covariance matrix estimate and said estimate of the forward channel response are received by said transmitter from said receiver over said reverse channel.